(12) United States Patent
Schurer et al.

(10) Patent No.: US 8,490,779 B2
(45) Date of Patent: Jul. 23, 2013

(54) TAIL STATION FOR A SCRAPER CHAIN CONVEYOR AND CHAIN WHEEL ASSEMBLY THEREFOR

(75) Inventors: Karl-Heinz Schurer, Herne (DE); Armin Hoppe, Bochum (DE); Robert Voigt, Bochum (DE)

(73) Assignee: Bucyrus Europe GmbH, Lunen (DE)

( * ) Notice: Subject to any disclaimer, the term of this patent is extended or adjusted under 35 U.S.C. 154(b) by 0 days.

(21) Appl. No.: 13/390,307

(22) PCT Filed: Aug. 2, 2010

(86) PCT No.: PCT/IB2010/053498
§ 371 (c)(1),
(2), (4) Date: Feb. 13, 2012

(87) PCT Pub. No.: WO2011/018731
PCT Pub. Date: Feb. 17, 2011

(65) Prior Publication Data
US 2012/0138431 A1 Jun. 7, 2012

(30) Foreign Application Priority Data
Aug. 14, 2009 (DE) ................. 20 2009 005 143 U

(51) Int. Cl.
*B65G 23/06* (2006.01)
(52) U.S. Cl.
USPC ........................................ 198/834
(58) Field of Classification Search
USPC ................. 198/834, 835, 813, 861.1
See application file for complete search history.

(56) References Cited

U.S. PATENT DOCUMENTS

| 4,093,065 | A | * | 6/1978 | Temme .................. 198/735.2 |
| 4,437,564 | A | * | 3/1984 | Redder et al. ............. 198/834 |
| 4,953,692 | A | * | 9/1990 | Stoppani et al. ........... 198/834 |
| 5,267,640 | A | | 12/1993 | Kerklies et al. |
| 5,947,265 | A | * | 9/1999 | Merten et al. ............. 198/834 |
| 6,227,354 | B1 | | 5/2001 | Howden et al. |
| 6,607,074 | B2 | | 8/2003 | Klabisch et al. |

(Continued)

FOREIGN PATENT DOCUMENTS

| DE | 25 35 437 A1 | 2/1977 |
| DE | 26 22 672 A1 | 12/1977 |

(Continued)

OTHER PUBLICATIONS

English Translation of the International Preliminary Report on Patentability dated Aug. 7, 2012, in corresponding International Application No. PCT/IB2010/053498, Filed Aug. 2, 2010.

*Primary Examiner* — Gene Crawford
*Assistant Examiner* — Keith R Campbell
(74) *Attorney, Agent, or Firm* — Foley & Lardner LLP

(57) ABSTRACT

A tail station for a scraper chain conveyor, in particular a transfer conveyor, including a machine frame having bearing holders, which are open at the margins, for a demountable chain wheel assembly, including a chain wheel assembly having a chain wheel shaft, a reversing chain wheel and bearing shells for the rotatable mounting of the chain wheel shaft, and having a deflector element assigned to the reversing chain wheel, the bearing holders being configured on cantilever arms connected to the machine frame and are upwardly open, wherein the chain wheel assembly is provided on the bearing shells with bearing blocks, which can be inserted with horizontal motional play into the bearing holders and are horizontally displaceable in the bearing holders between a removal position and a locking position.

19 Claims, 5 Drawing Sheets

U.S. PATENT DOCUMENTS

| | | | |
|---|---|---|---|
| 6,708,817 B2 * | 3/2004 | Klabisch et al. | 198/813 |
| 7,207,435 B2 * | 4/2007 | Bude et al. | 198/834 |
| 7,604,113 B2 | 10/2009 | Pluszynski et al. | |
| 7,806,254 B2 * | 10/2010 | Brayman et al. | 198/832 |
| 8,042,682 B2 * | 10/2011 | Ertel | 198/834 |
| 2012/0000752 A1 * | 1/2012 | Kruger | 198/834 |

FOREIGN PATENT DOCUMENTS

| | | |
|---|---|---|
| DE | 35 07 674 A1 | 10/1985 |
| DE | 41 33 808 A1 | 5/1992 |
| DE | 42 00 565 A1 | 7/1993 |
| DE | 299 15 798 U1 | 4/2000 |
| DE | 100 50 699 C1 | 6/2002 |
| DE | 203 01 584 U1 | 5/2003 |
| DE | 20 2004 013 198 U1 | 10/2004 |
| GB | 1 574 912 A | 9/1980 |
| GB | 2 156 943 A | 10/1985 |

* cited by examiner

TAIL STATION FOR A SCRAPER CHAIN CONVEYOR AND CHAIN WHEEL ASSEMBLY THEREFOR

The invention relates to a tail station for a scraper chain conveyor, in particular a tail station for a transfer conveyor, comprising a machine frame having bearing holders, which are open at the margins, for a demountable chain wheel assembly, comprising a chain wheel assembly having a chain wheel shaft, a reversing chain wheel and bearing shells for the rotatable mounting of the chain wheel shaft, and preferably comprising at least one chain deflector element assigned to the reversing chain wheel. The invention further relates to a chain wheel assembly for a tail station, comprising a chain wheel shaft, a reversing chain wheel and bearing shells for the rotatable mounting of the chain wheel shaft.

BACKGROUND OF THE INVENTION

In underground mining, scraper chain conveyors are used as face conveyors, drift conveyors or transfer conveyors in order to, on the one hand, convey the minerals mined with a mining tool, e.g. coal, from the face and, on the other hand, deliver it to a drift conveyor, in particular a belt conveyor, with which the material is transported over large distances. While face conveyors are generally provided with drive stations at both ends, in the case of the drift conveyor and, in particular, in the case of the transfer conveyor, on one side only a tail station are used, which tail station differs from a drive station in that the reversing chain wheel, or the chain wheel shaft which supports it, is not coupled to a drive. The tail station of a transfer conveyor can be configured, above all, as a so-called cross frame, in which, in particular, the installation space for the reversing chain wheel and the chain wheel shaft which supports it is relatively tight.

Tail stations of the generic type, including in the form of a cross frame, are known to the person skilled in the art of underground mining. In principle, it is possible also in the tail station to use the same chain wheel shaft or chain wheel assembly as in a drive station, as is described, for example, in DE 20 2004 013 198 U1. From DE 42 00 565 A1, it is further known to design the transfer station such that the machine frame can be used for the left-hand connection or right-hand connection of a drift conveyor, according to choice.

From DE 100 50 699 C1 (U.S. Pat. No. 6,607,074), it is known to mount the drive shaft of a conveyor drive station on a machine frame in a height-adjustable manner by means of adapter plates. The height adjustability is realized by means of long holes in the adapter plates and threaded screws screwed into the machine frame.

SUMMARY OF THE INVENTION

An object of the invention is to optimize a tail station in particular for high-performance conveyors and, at the same time, to facilitate the exchange of a chain wheel shaft assembly.

This object an others are achieved according to the invention in respect of a tail station by virtue of the fact that the bearing holders are configured on cantilever arms connected to the machine frame and are upwardly open, wherein the chain wheel shaft are provided on the bearing shells with bearing blocks, which can be inserted with horizontal motional play into the bearing holders and are horizontally displaceable in the bearing holders between a removal position and a locking position. The use of cantilever arms with upwardly open bearing holders allows the chain wheel shaft to be exchanged from above even with minimally available installation space, unlike, for example, according to DE 20 2004 013 198 U1. At the same time, the horizontal motional play allows the chain wheel assembly to be locked to the machine frame by torque locking, or released from this torque locking in a simple manner, whereby additional bolt securements or screw locking mechanisms can be dispensed with, if need be even fully dispensed with, by virtue of the horizontal displacement.

In the particularly preferred embodiment, the bearing shells have inner sides having a reach-through opening for the chain wheel shaft and outer sides on which the bearing blocks are configured as axial end journals of the chain wheel assembly. This measure ensures minimization of the necessary length of the chain wheel shaft and, already by virtue of this measure, weight saving, since, in contrast to the prior art, in which the bearing shells themselves have been received in the bearing holders, the bearing shells, which are large in volume and receive bearings, can lie further inside. In a preferred embodiment, the displacement, or at least the locking of the bearing blocks in the locking position, is realized by means of wedge elements, which in the assembled state, together with the bearing blocks, then completely fill the bearing holders by positive locking. For the cooperation with the wedge elements, it is particularly advantageous if the bearing holders respectively essentially have a rectangular cross section with front face wall, rear wall as well as a bottom wall, and if each bearing block is provided with a front edge, a bottom edge and a back edge, wherein the back edge is preferably constructed with a bevel with which the wedge bevel of the wedge element can then cooperate. As a result of this pushing in or banging in of a wedge element, in particular from above, the horizontal displacement of the bearing blocks, and thus of the entire chain wheel assembly, can be achieved relatively simply, at the same time as possible release is prevented for as long as the wedge elements, together with the bearing blocks, are present in the bearing holder. The arrangement of the wedge bevel on the back edge takes advantage of the fact that the reversing chain wheel is anyway subjected only to tensile load and, to this extent, is pulled always in the direction of the scraper chain conveyor or transfer conveyor.

According to a particularly advantageous embodiment, the bearing shells are provided at least on one side with a substantially flat front face, on which at least one projection is configured for torque-supporting purposes, which projection in the locking position bears against a supporting shoulder or step present on the machine frame side. The torque support of the chain wheel assembly is hence realized solely via the bearing shells, wherein the torque support is only active when the bearing blocks of the chain wheel assembly are in the locking position. The horizontal displacement of the bearing blocks or of the chain wheel assembly into the removal position hence immediately removes the torque support for the chain wheel assembly. It is further advantageous if the cantilever arms and/or the supporting block are fastened detachably to the machine frame. In particular, this measure allows in a particularly advantageous embodiment for the same machine frame to also be used, if need be, as a drive station, since the cantilever arms are positioned such that they have a lesser distance apart than, for example, bearing shell holders in the side panels of a machine frame. The shorter the distance apart of the cantilever arms, the smaller the weight of the chain wheel assembly as a whole turns out to be. It is particularly advantageous if at least the two cantilever arms are a component part of a bracket which can be exchangeably fastened, in particular screwed, to the machine frame.

The construction of a tail station, in addition to the exchange of wearing parts, is also facilitated by the fact that, according to a particularly advantageous embodiment, which, if need be, is of independent inventive importance, the chain deflector elements are provided with at least one deflector tongue on an element front face side and with a locking lug on an element rear side. The deflector tongues preferably extend in a crescent shape on the element front face side, so that the chain deflector element is active both in the chain inlet and in the chain outlet. It is particularly advantageous when a cover plate is provided, which cover plate, in the assembled state, overlaps the bearing holders and overlaps the locking lugs, whereby, if need be, solely via the cover plate, both the release of the wedge elements to prevent unwanted horizontal displacement of the bearing blocks, and thus of the chain wheel shaft assembly, and a release of the chain deflector elements can be prevented. In order with the cover plate to achieve clamping of the locking lugs and holding of the chain deflector elements by positive locking, it is particularly advantageous if the locking lug is provided with at least one groove, in particular a semicircular groove on the lower and, if need be, also on the upper transverse side, with which the chain deflector element, for pivoting in and out, can be mounted on a round ledge present on the machine frame side. At the same time, movement of the chain deflector element in the motional direction of the chain is then prevented by positive locking. Once the cover plate is mounted, the locking lug can then be clamped between the bottom side of the cover plate and a bottom ledge and secured by positive locking. The exchange of the chain deflector elements can then be realized without the chain wheel assembly having to be demounted or moved. The round ledge and the supporting ledge for the chain deflector elements can be configured in total on the bracket.

The inventive objects are also achieved by a chain wheel assembly for a corresponding tail station, in which according to the invention it is provided that the bearing shells are provided on outer sides with bearing blocks, which form axial end journals of the chain wheel assembly and can be inserted from above into bearing holders on the tail station. In the chain wheel assembly, it is particularly advantageous if the bearing shells are provided at least on one side with a substantially flat front face, on which there is configured at least one projection for torque-supporting purposes, and/or if the bearing blocks are provided with a front edge, a bottom edge and a back edge, wherein the back edge is preferably provided with a bevel.

These and other objects, aspects, features, developments and advantages of the invention of this application will become apparent to those skilled in the art upon a reading of the Detailed Description of Embodiments set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein.

DETAILED DESCRIPTION OF EMBODIMENTS

Figure 1:
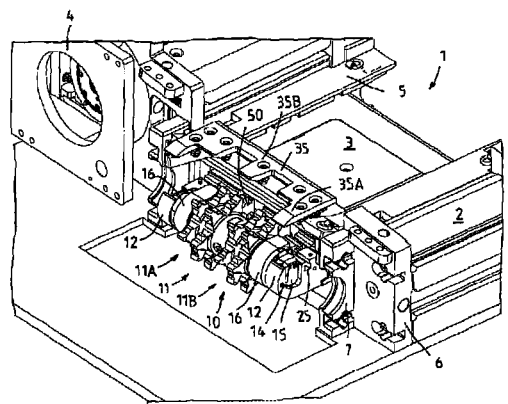
FIG. 1 shows in perspective representation, partially broken open, an inventive transfer station in the form of a cross frame with mounted chain wheel assembly for the reversing chain wheel, with the cover plate lifted off.

Referring now to the drawings wherein the showings are for the purpose of illustrating preferred and alternative embodiments of the invention only and not for the purpose of limiting same, FIG. 1 shows an inventive transfer station for a transfer scraper chain conveyor is denoted in its entirety by the reference symbol 1. The transfer station 1 is configured as a cross frame, at which the chain strands, such as feed and return strands of a face conveyor, the upper strand of which is denoted by the reference symbol 2, and of a transfer conveyor, the upper strand of which lies deeper than the upper strand 2 of the face conveyor and in FIG. 1 is denoted by the reference symbol 3, intersect. The chain strands of the face and transfer conveyor, which respectively consist of a double middle chain having scrapers, connected to the horizontal links thereof, as carrier elements, are not represented in the figures. The cross frame has as the central part a machine frame 5, on which the respective upper strands 2, 3 and lower strands are configured. For the face conveyor, a receiving head 4 for a bearing shaft for the chain sprocket (not shown) of the face conveyor is disposed at the, in FIG. 1, left-hand, rear end of the machine frame, which receiving head 4 is fastened, preferably detachably, to a the central machine frame 5. At the, in FIG. 1, right-hand end, a connecting piece 6 is connected detachably to the machine frame 5, to which the individual trough pans (not represented) of the face conveyor can be connected, and to the, in FIG. 1, right-hand rear end of the machine frame 5, trough pans for the transfer conveyor can be connected so as, with a scraper chain revolving in the transfer conveyor, to transport the material falling from the upper strand 2 into the upper strand 3 of the transfer conveyor rearward out of the plane of the drawing, and then, for example, deliver it to a belt conveyor as the drift conveyor, as is known per se to the person skilled in the art of underground mining for transfer conveyors.

It is evident from FIG. 1 that in the shown illustrative embodiment the machine frame 5 is also provided on the head side of the upper strand 3 of the transfer conveyor with bearing sockets 7, which on the head side are open at the margins and into which, from the head, a standard chain wheel shaft with drive chain wheel could be mounted and demounted. In the shown illustrative embodiment, on the other hand, the bearing sockets 7 are functionless, since a chain wheel assembly 10 with the reversing chain wheel 11 is supported at both ends on cantilever arms 12, which are here fastened detachably to the machine frame 5 by means of a bracket 60 shown in detail in FIG. 7 and additionally described further below. The reversing chain wheel 11 is provided with two chain sprockets 11A and 11B, which are spaced apart via a spacer sleeve and are seated in a rotationally fixed manner on a chain wheel shaft (13, FIGS. 4 and 5), as will be further explained.

In the first illustrative embodiment, both cantilever arms 12 are provided, for the relocation of the chain wheel assembly 10, with pocket-like bearing holders 14 of U-shaped cross section, which are upwardly open to enable the chain wheel assembly 10 to be inserted from above into the bearing holders 14 in the cantilever arms 12 or be demounted in the upward direction. The chain wheel assembly 10 is here seated in the bearing holders 14 with bearing blocks 15, which respectively form end journals of the chain wheel assembly 10 and are respectively fastened to the outer side (16A, FIG. 2) of bearing shells 16, in whose interior the chain wheel shaft 13 is rotatably supported by means of bearing rings 17, as shown, in turn, by FIGS. 4 and 5.

Figure 2:
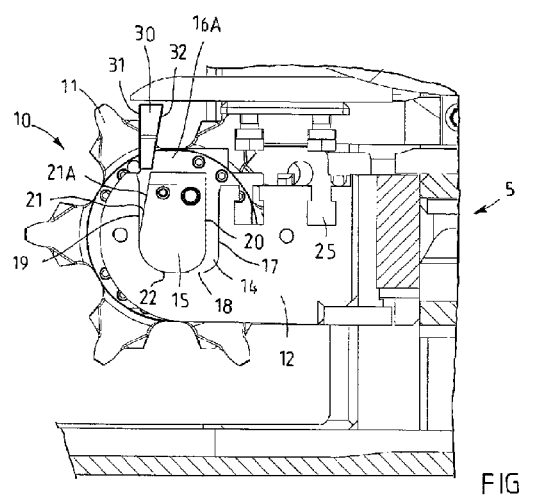
FIG. 2 shows in side view, partially broken open, one of the cantilever arms with mounted chain wheel shaft in the removal position according to a first embodiment.
Figure 3:
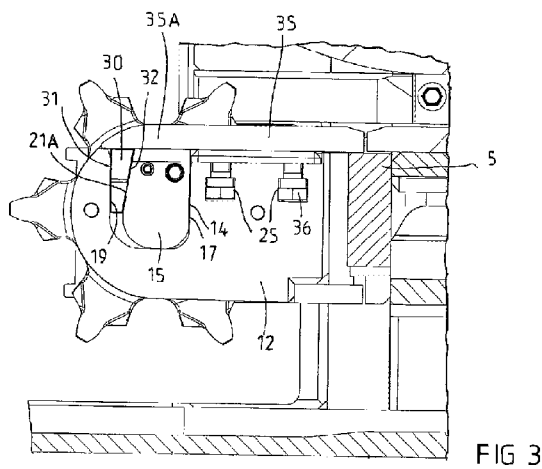
FIG. 3 in the same view as FIG. 2 the cantilever arm according to the first embodiment with chain wheel shaft in the locking position, with mounted cover plate.

Reference is now made firstly to FIGS. 2 and 3, on the basis of which the basic mounting of the chain wheel assembly 10 on the cantilever arms 12 is explained. In FIG. 2, the respective bearing block 15 at the end of the chain wheel assembly 10 is already inserted in the associated bearing holder 14 and is in a removal position. The bearing holder 14 of rectangular cross section has a front face wall 17, a bottom wall 18 and a rear wall 19, the distance between the front face wall 17 and the rear wall 19 being greater than the width of the bearing block 15 between a front edge 20 and a back edge 21. The bottom edge 22 of the bearing block 15 rests on the bottom wall 15 and, as a result of the different dimensions, a horizontal motional play remains, such that the bearing block 15 and, to this extent, the whole chain wheel assembly 10 can be displaced from the removal position in FIG. 2 to the right into a locking position according to FIG. 3. It can also clearly be seen from FIG. 2 that the back edge 21, almost over the whole of its height, is provided with a bevel 21A. Cooperating with the bevel 21A for the mounting or securement of the bearing block in the locking position, as shown in FIG. 3, is a wedge element 30, which has a straight wedge rear side 31 and an oblique wedge front face side 32 in order that, when the wedge element 30 is banged in downward, the bearing block 15 can be horizontally displaced in the bearing holder 14. In the locking position according to FIG. 3, the bearing block 15 is displaced to the right in the bearing holder 14 such that the front face edge 21 of the bearing block 15 bears against the front face wall 17 of the bearing holder 14, while at the same time the wedge bevel 32 bears against the bevel 21A and the wedge rear side 31 bears against the rear wall 19 of the bearing holder 14. In order to prevent the wedge element 30 from moving upward out of the locking position, a cover plate 35 covers, inter alia, also the bearing holder 14 with a front cover member 35A, which can be seen particularly clearly from FIG. 1. The cover plate 35 is locked in place, inter alia, on the cantilever arm 12 by means of headed screws 36, which engage in undercut long holes 25 which are open to the sides of the cantilever arms 12. The cantilever arms 12 themselves can be welded to the machine frame 5 or detachably bolted to the latter. The bearing blocks 15 are preferably screwed to the outer sides 16A of the bearing shells. The inner sides of the bearing shells are provided with reach-through openings for the chain wheel shaft 13.

Figure 4:
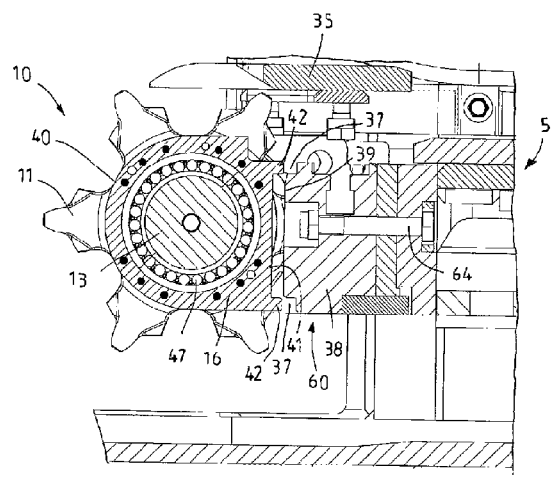
FIG. 4 shows a vertical section through one of the bearing holders with the chain wheel shaft in the removal position.
Figure 5:
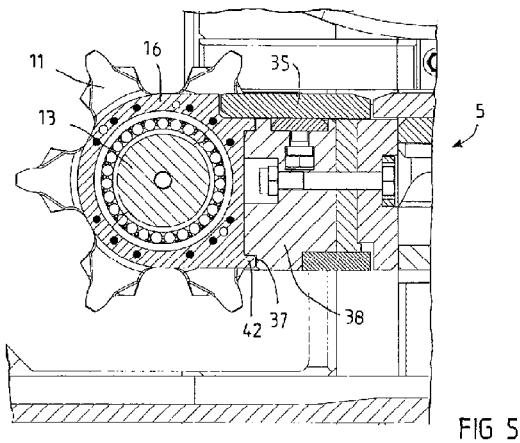
FIG. 5 in sectional view through one of the bearing holders the chain wheel shaft in the locking position, with mounted cover plate.

Reference is now made to FIGS. 4 and 5, which respectively show sectional views through the bearing shells 16, by means of which the chain wheel shaft 13 is supported via bearing rings 47 rotatably against the machine frame 5 by means of the supporting arms (not discernible in FIGS. 4 and 5). The bearing shells 16 have a cylindrically curved surface 40 and a substantially flat, in FIGS. 4 and 5, right-hand front face 41, at whose upper and lower end a projection 42 respectively protrudes. At the same time, a supporting block 38 is screwed to the machine frame 5, here detachably together with a bracket 60, the front face 39 of which supporting block is provided at the top and bottom with a step 37, as an offset, wherein the distance between the two steps 37 is dimensioned such that the projections 42 can be slid in a clamp-like manner onto the depressions formed with the steps 37. The motional play with which the bearing blocks 15 can be horizontally displaced in the bearing holders 14 is dimensioned such that in the removal position, as shown in FIG. 4, the lower projection 42 can be raised parallel to the front face 39; that clamp-like clasping of or engagement in the steps 37 is realized only in the locking position, as shown in FIG. 5. The bearing shells 16 can hence via the projections 42 effect a torque support or rotationally fixed positioning of the whole chain wheel assembly 10 on the machine frame 5 and, at the same time, relieve the bearing blocks 15 of the rotation forces which are transmitted via the chain and chain sprockets of the reversing chain wheel into the chain wheel shaft 13 and, to this extent, the bearing shells 16.

Figure 6:
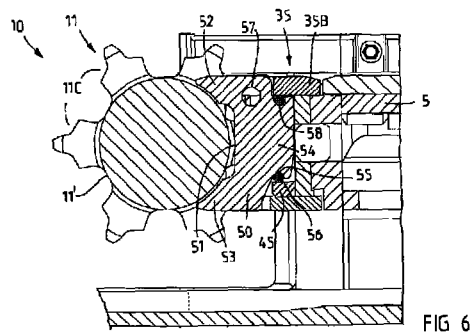
FIG. 6 shows a vertical section through the chain wheel shaft in the plane of a chain deflector.

Reference is now made to FIGS. 1 and 6. The scraper chain (not shown) generally consists of relatively heavy, eye-like vertical and horizontal chain links. Each chain sprocket of the reversing chain wheel has two mutually spaced rows of sprocket rings, which, for the reception of the horizontal chain links of the scraper chain, form pockets 11C, the vertical chain links being able to position themselves into the gap between the sprocket ring rows. In order to improve the running of the chain strands into and out of the chain sprockets of the reversing chain wheel 11, chain deflectors 50 are mounted together with the chain wheel assembly 10, which chain deflectors can be prone to relatively high wear and therefore need to be exchanged relatively regularly. In the inventive tail station 1, chain deflectors 50 which can be mounted or demounted with the chain wheel assembly 10 installed are used. As FIG. 6 shows, the chain deflectors 50 have on an element front face side 51 an upper deflector tongue 52 and a lower deflector tongue 53, and on an element rear side a locking lug 54, which at the top and bottom is respectively provided with a semicircular groove 55, 58. The lower groove serves as a retaining element and pivot joint and can be placed onto a round ledge 56, which is welded on a bottom-side supporting ledge 45. The inner faces of the two deflector tongues 53, 52 are curved in the shape of an arc, so that the tongues 52, 53, in the assembled state of the chain deflector element 50, can come to lie relatively close to the outer face 11' of the chain wheel 11. The deflector tongues 52, 53 here reach respectively into the gap or slot between the two rows of sprocket rings of the chain sprockets of the reversing chain wheel 11. Configured in the machine frame, or in this case on a demountable bracket encompassing, inter alia, the supporting block 38, as is further described, is a supporting ledge 45, above which is formed a receiving space, which is upwardly covered solely by means of the cover plate 35, to be precise by a rear ledge 35B of the cover plate 35. For the removal of a chain deflector 50, it is hence sufficient to demount the cover plate 35 and to pivot out the chain deflector element 50 first forward and then upward. The manual pivoting can be facilitated by the grip opening 57 behind the upper deflector tongue 52, into which a hook can also be hooked. In a double scraper chain conveyor having two chain sprockets, two chain deflector elements 50 are used.

Figure 7:
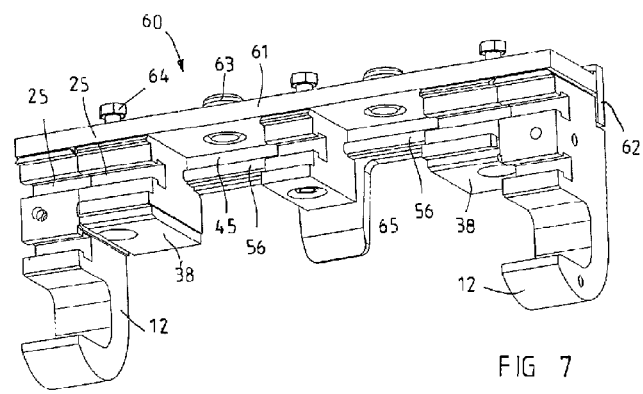
FIG. 7 shows in perspective representation the bracket which is used in the first illustrative embodiment and which can be fastened detachably to the machine frame.

FIG. 7 shows in detail the bracket 60, which can be detachably mounted on the machine frame and contains both the two cantilever arms 12 and the functional elements for the mounting of the cover plate and for the inward pivoting of the chain deflector elements. The bracket 60 has a rear plate 61 and a bottom plate 62, to which respectively, close to the outer ends of the bracket 60, the two cantilever arms 12 are welded in protruding arrangement. The rear plate 61 is provided with positioning pins 63 and is penetrated by screw bolts 64 for screwing the bracket 60 detachably to the machine frame 5, as shown, for example, in FIG. 4. Respectively welded to a section of the bottom plate 62 are the supporting ledges 45, to which, in turn, the round ledges 56 are welded as lower pivoting aids and retaining devices. Respectively adjacent to a cantilever arm 12, the supporting block 38 is welded to the bracket 60, and in the middle is configured a further middle block 65, wherein the chain sprockets of the chain wheel, in the assembled state, are respectively located between the supporting block 38 and the middle block 65. The bracket 60 hence comprises all the elements which are necessary to fit the chain wheel shaft and the chain deflector elements, including to mount the cover plate, since the grooves 25 run in the top sides of the cantilever arms 12 and supporting blocks 38.

Figure 8:
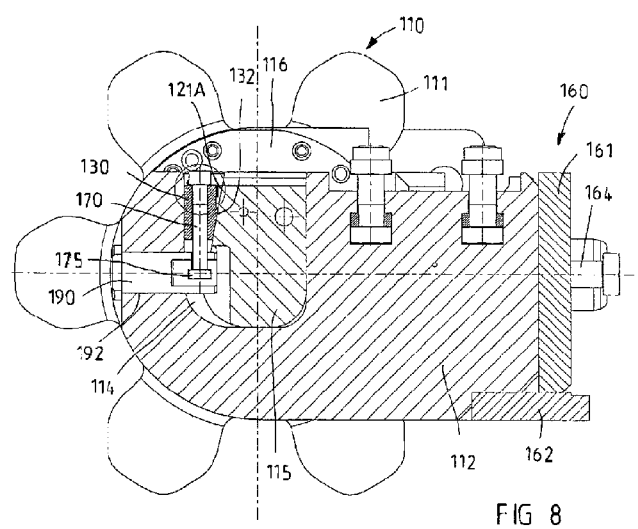
FIG. 8 shows in side view, partially broken open, one of the cantilever arms with mounted chain wheel shaft in the closing position, according to a second embodiment.
Figures 9, 10:
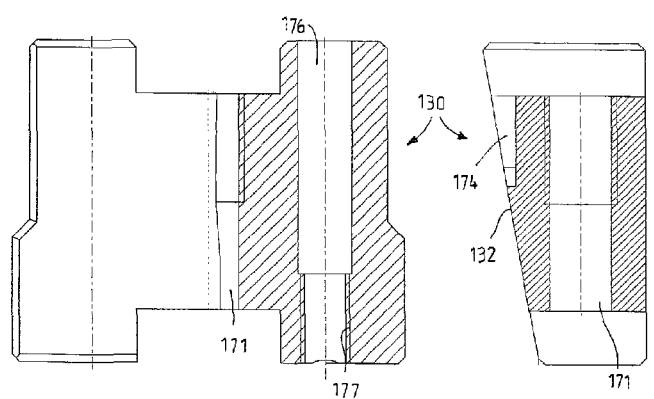
FIG. 9 shows a wedge element used in the second embodiment in a view of the straight side of the wedge element, partially broken open.
FIG. 10 shows the wedge element from FIG. 9 in side view, partially broken open.

Reference is now made to FIGS. 8 and 9 to 13, in which slightly modified cantilever arms 112 and slightly modified wedge elements 130, in addition to mounting means for the wedge elements 130, are represented. As FIG. 8 shows, the cantilever arms 112, here too, are welded to a bracket 160, which comprises a rear plate 161 and a bottom plate 162 and can be fastened by means of screw bolts 164 to a machine frame (not shown here). The cantilever arm 112, in turn, has an upwardly open, substantially U-shaped bearing holder 114, in which a chain wheel assembly 110 (only indicated here) supporting the chain wheel 111 can be mounted and fastened by means of bearing blocks 115 configured on the bearing shells 116 of said chain wheel assembly. Here too, the bearing blocks 115 have a smaller width than the width of the bearing holder 114 in order to be able to horizontally displace the entire chain wheel assembly 110 between a removal position and a locking position, wherein—as in the previous illustrative embodiment—torque supporting means on the bearing shells 116 engage in corresponding counterstop means on the bearing bracket 160 only in the locking position, as shown in FIG. 8.

Figures 11, 12:
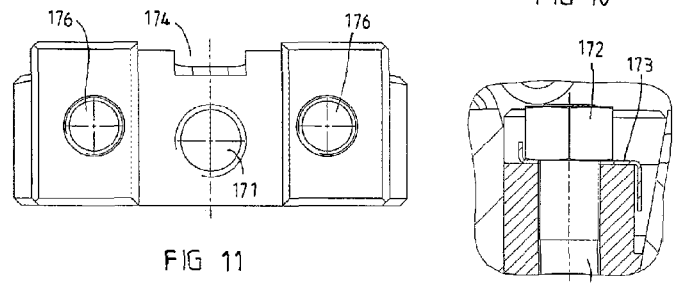
FIG. 11 shows the wedge element from FIG. 9 in top view.
FIG. 12 shows a detailed view of the screw locking mechanism of the wedge element in FIG. 8.
Figure 13:
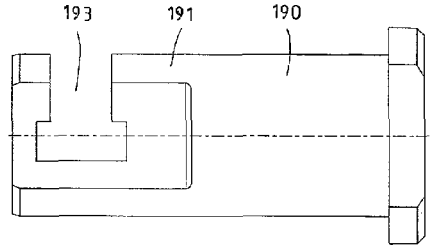
FIG. 13 shows the clamping bolt holding dowel used in the second embodiment, in side view.

Unlike the previous illustrative embodiment, the wedge element 130 can here however be pulled deeper down into the bearing holder 114 by means of a clamping bolt 170 so as to be able to apply, via the wedge bevel 132 and the bevel 121A on the bearing block 115, forces which holds the bearing blocks 115, and thus the entire chain wheel assembly 110, in locking position even when no cover plate is mounted. As can be seen particularly clearly from FIG. 9 to 11, the wedge element 130 here consists of a, in front view, roughly H-shaped body, which is centrally provided with a through bore 171, which in the assembled state of the wedge element 130, as shown in FIG. 8 and the detailed view in FIG. 12, is penetrated by the clamping bolt 170. The clamping bolt 170 has at one of its bolt ends a threaded portion, onto which is screwed a clamping nut 172 which can be secured against loosening with a fishplate 173.

The fishplate 173 has a thickness which allows the fishplate to be able to be further bent with the tools which are generally available underground in order that, in the assembled state of the butt-strapped securement, the fishplate 173 can be bent with a marginal tab into a marginal recess 174 extending, opposite the through bore 171, centrally and in the upper region of the wedge bevel 132. In order that the wedge element 130 can be mounted and demounted, the bolt head 175 of the clamping bolt 170, as shown in FIG. 8, is supported by means of a holding dowel 190 against the cantilever arm 112. The holding dowel 190 can here be inserted with a dowel shaft 191 into a bore 192, which extends from the front face side of the cantilever arm 112 into the bearing holder 114. The dowel shaft 191 is in turn provided with an undercut T-groove 193, the width of which, in the lower, undercut region, is tailored to be able to receive the bolt head 175 of the clamping bolt 170 and which, at the same time, is open to the sides so as to be able to support the clamping bolt against the holding dowel 190 once the wedge element 130 has been demounted. The wedge element 130 is also provided, in this case to both sides of the through bore 171, with threaded bores 176, which are here provided only partially, namely close to the lower end of the wedge element 130, with a thread 177, into which release bolts can be screwed in order to be able push the wedge element 130, which after assembly and, in particular, after operating use, is generally fixedly seated, uniformly upward out of the bearing holder 114 by the screwing-in of two release bolts (not shown). In the shown illustrative embodiment, the through bore 171 is additionally provided in the upper portion with a further thread to allow a load hook, for example, to be screwed in there, by which load hook the wedge element can additionally be pulled out upward.

For the person skilled in the art, numerous modifications which shall fall within the scope of the appended claims emerge from the preceding description. The locking of the bearing blocks in the bearing holders by means of a wedge element constitutes the preferred embodiment. Other clamping pieces could also be used. The wedge faces could also be configured directly on the bearing blocks and the bearing holders and/or the sliding in and out is realized such that, when the bearing blocks are lowered, the horizontal displacement is at the same time initiated. The horizontal displacement can also be realized along a bevel or via a saddle.

Further, while considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A tail station for a scraper chain conveyor, in particular a tail station for a transfer conveyor, comprising a machine frame having bearing holders, which are open at the margins, for a demountable chain wheel assembly, the chain wheel assembly having a chain wheel shaft, a reversing chain wheel and bearing shells for the rotatable mounting of the chain wheel shaft, and comprising at least one deflector element assigned to the reversing chain wheel, the bearing holders being configured on cantilever arms connected to the machine frame and being upwardly open, the chain wheel assembly is provided on the bearing shells with bearing blocks which are insertable with horizontal motional play into the bearing holders and are horizontally displaceable in the bearing holders between a removal position and a locking position.

2. The tail station as claimed in claim 1, wherein the bearing shells have inner sides having a reach-through opening for the chain wheel shaft and outer sides on which the bearing blocks are configured as axial end journals of the chain wheel assembly.

3. The tail station as claimed in claim 1, wherein each bearing block is securable against horizontal displacement by a wedge element in the bearing holder.

4. The tail station as claimed in claim 1, wherein the bearing holders respectively have a substantially rectangular cross section with front face wall and rear wall as well as bottom wall, and in that the bearing block is respectively provided with a front edge, a bottom edge and a back edge, wherein the back edge is provided with a bevel.

5. The tail station as claimed in claim 1, wherein the bearing shells are provided at least on one side with a substantially flat front face, on which at least one projection is configured for torque-supporting purposes, which projection in the locking position bears against a supporting shoulder present on a machine frame side.

6. The tail station as claimed in claim 5, wherein the bearing shells have two mutually spaced projections which are slidable in a clamp-like manner onto a supporting block on the machine frame.

7. The tail station as claimed in claim 6, wherein at least one of the cantilever arms and the supporting block are fastened detachably to the machine frame.

8. The tail station as claimed in claim 1, wherein the cantilever arms are at least two cantilever arms, the at least two cantilever arms being a component part of a bracket which is exchangeably fastenable to the machine frame.

9. The tail station as claimed in claim 1, wherein the at least one chain deflector elements is provided with at least one deflector tongue on a deflector element front face side and with a locking lug on a deflector element rear side.

10. The tail station as claimed in claim 9, further including a cover plate which in the assembled state overlaps the bearing holders and overlaps the locking lug of the chain deflector elements.

11. The tail station as claimed in claim 9, wherein the chain deflector elements are held solely by positive locking between the locking lug, the machine frame and the cover plate, wherein the locking lug is provided with at least one semicircular groove for pivotal engagement or retentive engagement on a round ledge.

12. The tail station as claimed in claim 1, wherein a wedge element is provided for the positional securement of the bearing block in the closing position, the wedge element having at least one through bore for a clamping bolt.

13. The tail station as claimed in claim 12, wherein the wedge element is provided to both sides of the at least one through bore with threaded bores for the screwing-in of release bolts.

14. The tail station as claimed in claim 1, wherein the cantilever arms are provided with a plug-in opening for a holding dowel for supporting a clamping bolt in the bearing holder.

15. A chain wheel assembly for a tail station for a scraper chain conveyor, in particular a tail station for a transfer conveyor, the tail station including a machine frame having bearing holders, which are open at the margins, at least one deflector element, the bearing holders being configured on cantilever arms connected to the machine frame and being upwardly open, the chain wheel comprising a chain wheel shaft, a reversing chain wheel and bearing shells for the rotatable mounting of the chain wheel shaft, the bearing shells being provided on outer sides with bearing blocks, which form axial end journals of the chain wheel assembly and are insertable from above into bearing holders on the tail station.

16. The chain wheel assembly as claimed in claim 15, wherein the bearing shells are provided at least on one side with a substantially flat front face, on which there is configured at least one projection for torque-supporting purposes.

17. The chain wheel assembly as claimed in claim 15, wherein the bearing block is provided with a front edge, a bottom edge and a back edge, wherein the back edge is provided with a bevel.

18. The chain wheel assembly as claimed in claim 15, wherein the bearing blocks are insertable with horizontal motional play into the bearing holders and are horizontally displaceable in the bearing holders between a removal position and a locking position.

19. The chain wheel assembly as claimed in claim 18, wherein each bearing block is securable against horizontal displacement by a wedge element in the bearing holder.

* * * * *